(12) United States Patent
Nojima

(10) Patent No.: US 10,903,778 B2
(45) Date of Patent: Jan. 26, 2021

(54) APPARATUS AND METHODS FOR MONITORING SUBSEA ELECTRICAL SYSTEMS USING ADAPTIVE MODELS

(71) Applicant: Eaton Intelligent Power Limited, Dublin (IE)

(72) Inventor: Geraldo Nojima, Matthews, NC (US)

(73) Assignee: Eaton Intelligent Power Limited

( * ) Notice: Subject to any disclaimer, the term of this patent is extended or adjusted under 35 U.S.C. 154(b) by 556 days.

(21) Appl. No.: 14/574,956

(22) Filed: Dec. 18, 2014

(65) Prior Publication Data

US 2016/0181967 A1    Jun. 23, 2016

(51) Int. Cl.
*H02P 31/00* (2006.01)
*G05B 17/02* (2006.01)

(52) U.S. Cl.
CPC .............. *H02P 31/00* (2013.01); *G05B 17/02* (2013.01)

(58) Field of Classification Search
CPC .......... G05B 17/02; H02P 31/00; E21B 47/01
See application file for complete search history.

(56) References Cited

U.S. PATENT DOCUMENTS

| | | | | |
|---|---|---|---|---|
| 4,249,238 A * | 2/1981 | Spang, III | ................. | F02C 9/28 60/39.24 |
| 5,233,512 A * | 8/1993 | Gutz | ....................... | G05B 9/02 318/563 |
| 7,050,863 B2 * | 5/2006 | Mehta | .................... | G05B 11/32 700/19 |
| 8,032,345 B2 * | 10/2011 | Le Ravalec | .............. | G01V 1/30 703/10 |
| 2004/0123600 A1 * | 7/2004 | Brunell | ..................... | F02C 9/00 60/773 |
| 2004/0168811 A1 * | 9/2004 | Shaw | ..................... | E21B 41/02 166/368 |
| 2004/0256152 A1 * | 12/2004 | Dashevskiy | ............ | E21B 44/00 175/25 |

(Continued)

FOREIGN PATENT DOCUMENTS

| WO | WO 2004/016904 A1 | 2/2004 |
|---|---|---|
| WO | WO 2011/094689 A1 | 8/2011 |

OTHER PUBLICATIONS

International Search Report and Written Opinion Corresponding to International Application No. PCT/US2015/063360; dated Mar. 11, 2016; 10 Pages.

(Continued)

*Primary Examiner* — Santosh R Poudel
(74) *Attorney, Agent, or Firm* — Stanek Lemon Crouse & Meeks, P.A.

(57) ABSTRACT

A system includes a controller circuit configured to provide control inputs to at least one component of a subsea electrical system, a simulator circuit coupled to the controller circuit and configured to maintain a model of the subsea electrical system and apply the control inputs to the model concurrent with provision of the control inputs to the at least one component and a monitor circuit coupled to the simulator circuit and configured to identify a status of the subsea electrical system responsive to the model. The simulator circuit may be configured to modify the model responsive to feedback signals received from the subsea electrical system and the monitor circuit may be configured to identify the status of the subsea electrical system responsive to a modification of the model.

6 Claims, 4 Drawing Sheets

(56) References Cited

U.S. PATENT DOCUMENTS

| | | | | |
|---|---|---|---|---|
| 2005/0193739 A1* | 9/2005 | Brunell | | G05B 13/042 60/772 |
| 2006/0169457 A1* | 8/2006 | Ramachandran | | C09K 8/52 166/310 |
| 2007/0100478 A1* | 5/2007 | Egeland | | G05B 19/41865 700/45 |
| 2007/0168057 A1* | 7/2007 | Blevins | | G05B 13/022 700/53 |
| 2007/0208549 A1* | 9/2007 | Blevins | | G05B 17/02 703/6 |
| 2009/0044938 A1* | 2/2009 | Crossley | | E21B 43/128 166/250.15 |
| 2009/0327204 A1* | 12/2009 | Gilhuly | | G05B 17/02 706/54 |
| 2010/0051286 A1* | 3/2010 | McStay | | E21B 47/123 166/336 |
| 2010/0105308 A1* | 4/2010 | Masse | | E21F 1/00 454/168 |
| 2010/0222899 A1* | 9/2010 | Blevins | | G05B 17/02 700/80 |
| 2010/0299119 A1* | 11/2010 | Erikson | | E21B 43/01 703/6 |
| 2011/0071966 A1* | 3/2011 | Holley | | E21B 47/0001 706/12 |
| 2011/0224959 A1* | 9/2011 | Zhang | | G05B 17/02 703/2 |
| 2012/0029892 A1* | 2/2012 | Thulke | | F03D 7/045 703/7 |
| 2012/0197686 A1* | 8/2012 | Abu El Ata | | G06Q 10/06393 705/7.39 |
| 2013/0069792 A1* | 3/2013 | Blevins | | G05B 17/02 340/815.4 |
| 2013/0112404 A1* | 5/2013 | Lovorn | | E21B 33/085 166/250.01 |
| 2013/0124119 A1* | 5/2013 | Reynaud | | G01R 31/11 702/59 |
| 2014/0116715 A1* | 5/2014 | Sipila | | E21B 47/06 166/336 |
| 2014/0278312 A1* | 9/2014 | Nixon | | G06F 3/0482 703/6 |
| 2015/0267590 A1* | 9/2015 | Sun | | F01N 11/002 60/274 |
| 2015/0300909 A1* | 10/2015 | Giunta | | G01M 5/0025 702/56 |
| 2015/0324719 A1* | 11/2015 | Gilmore | | G05B 15/02 705/7.22 |
| 2017/0153358 A1* | 6/2017 | Hansen | | G01V 99/005 |

OTHER PUBLICATIONS

Notification Concerning Transmittal of International Preliminary Report on Patentability, PCT/US2015/063360; dated Jun. 20, 2017; 7 Pages.

* cited by examiner

APPARATUS AND METHODS FOR MONITORING SUBSEA ELECTRICAL SYSTEMS USING ADAPTIVE MODELS

BACKGROUND

The inventive subject matter relates to electrical systems and methods of operating the same and, more particularly, to subsea electrical systems and methods of operating the same.

Subsea electrical systems, such as those used in offshore oil and gas exploration and production, offshore wind farms, wave and/or thermohaline ocean circulation power generation, may include loads, such as motors, heating devices and the like, and power distribution and control components, such as power cables, power converters, circuit breakers, and motor drives (e.g., variable frequency drives), that provide power to such loads. As development has moved further offshore and to greater depths, subsea electrical systems have become more complex, with difficult to access components separated by relatively large distances. Subsea power cables and associated components, for example, may extend over several kilometers and may be particularly difficult to monitor. Monitoring such systems may require the use of a large number of sensors and extremely long communications links. Due to the level of complexity and the rigors of the application environment, it may be impractical to provide sensors for points of interest in such systems.

SUMMARY

Some embodiments of the inventive subject matter provide a system including a controller circuit configured to provide control inputs to at least one component of a subsea electrical system. A simulator circuit is coupled to the controller circuit and configured to maintain a model of the subsea electrical system and apply the control inputs to the model concurrent with provision of the control inputs to the at least one component. A monitor circuit is coupled to the simulator circuit and configured to identify a status of the subsea electrical system responsive to the model. The simulator circuit may be configured to modify the model responsive to feedback signals received from the subsea electrical system and the monitor circuit may be configured to identify the status of the subsea electrical system responsive to a modification of the model.

The at least one component may include, for example, a power converter, a switch, and/or a motor drive. The monitor circuit may be configured to identify a status of a component of the subsea electrical system other than the at least one component. For example, the component of the subsea electrical system other than the at least one component may include a power line and/or a motor.

Further embodiments provide methods including generating a model of a subsea electrical system, concurrently controlling the model and at least one component of the subsea electrical system and identifying a status of the subsea electrical system responsive to the model. The model may be modified responsive to feedback signals from the subsea electrical system and identifying a status of the subsea electrical system may include identifying the status of the subsea electrical system responsive to the modification of the model. Some embodiments may provide a computer program product including computer program code embodied in a non-transitory computer-readable medium and executable on at least one data processor to perform the methods described.

DETAILED DESCRIPTION

Figure 1:
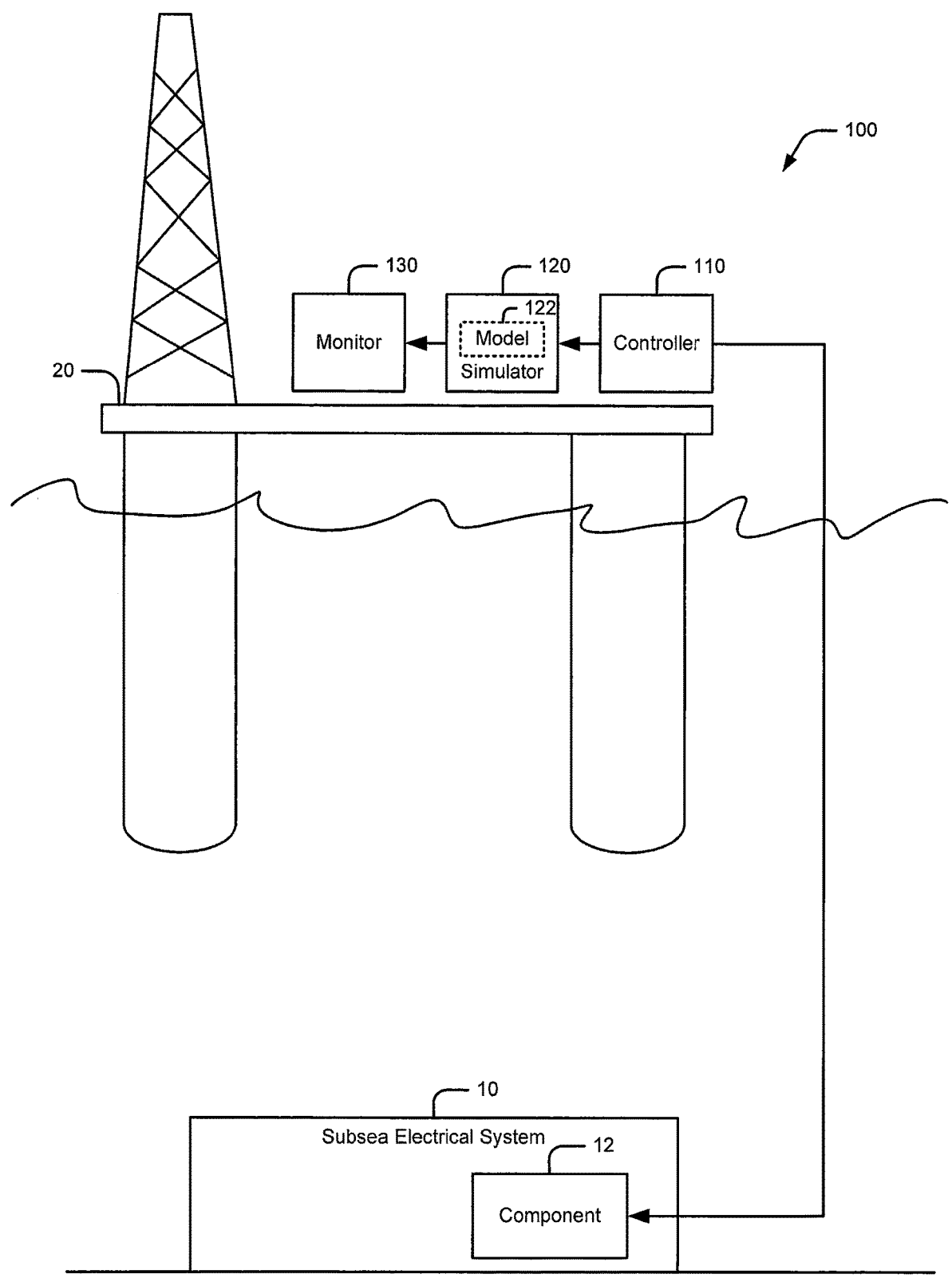
FIG. 1 is a schematic diagram illustrating apparatus and methods for operating a subsea electrical system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

The inventive subject matter may be embodied as apparatus, methods and computer program products. Some embodiments may be described with reference to block diagrams and/or operational illustrations that illustrate structures and operations. Blocks of the block diagrams and/or operational illustrations may generally implemented using electric circuits configured to perform the specified functions. These "circuits" may generally be implemented using analog and/or digital circuitry. The circuits may comprise discrete components and/or integrated components, such as data processing integrated circuits (e.g., microprocessors, microcontrollers, digital signal processors and the like) and application-specific integrated circuits (ASICs).

Each block in such diagrams may represent a module, segment, or portion of computer-executable program code for implementing the specified logical function(s). Computer-executable program code may be provided one or more data processors, special purpose processors, ASICs, and/or other programmable data processing apparatus, such that the instructions, which execute to the code to provide the functions/acts specified in the block diagrams and/or operational block or blocks.

These computer-executable program code may also be stored in a non-transitory medium that may direct a controller circuit to function in a particular manner, such that the program code stored in the non-transitory medium constitute an article of manufacture including instructions that implement the functions specified in the block or blocks of the block diagrams and/or operational illustrations. The non-transitory medium may be, but is not limited to, an electronic, magnetic, optical, electromagnetic, or semiconductor system, apparatus, or device. More specific examples (a non-exhaustive list) of the non-transitory medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

Some embodiments of the inventive subject matter arise from a realization that hardware in the loop (HIL) systems may be advantageously used to provide virtual monitoring of states of real systems by monitoring virtual models corresponding to real physical systems driven by the same control inputs. Using such models potentially reduces the need for sensing actual system states and, concomitantly, can reduce the need for sensors. Such techniques may be particularly advantageous in applications such as subsea electrical systems, which may be impractical to directly monitor due to the complexity and scale of such systems and the difficulties presented by the environments in which they are deployed.

The value of a simulation model is proportional to its ability to reflect the real life device or system that it models. Creating and optimizing simulation models of the components of undersea systems can be a difficult task due to the difficulty of real-time correlation of their performance versus the real life systems and components. According to some embodiments, correlation of models to actual undersea systems may be improved.

FIG. 1 illustrates a system 100 for operating an undersea electrical system 10 according to some embodiments of the inventive subject matter. The system 100 includes controller 110, which is configured to operate at least one component 12 of the subsea electrical system 10. The system 100 also includes a simulator 120 configured to maintain a model 122 of the subsea electrical subsystem 10. In particular, the simulator 120 is configured to provide control inputs provided to the at least one component 10 to the model 122 and to adapt the model 122 responsive to state outputs provided from the subsea electrical system 10. The system 100 further includes a monitor 130 configured to identify target events responsive to adaptation of the model 122. Such target events may be model changes that indicate, for example, a failure or other status change of a component of the subsea electrical system 10 other than the component 12 controlled by the controller. The monitor 130 may be configured to provide notification of the detection of such target events to a user (e.g., a human and/or automated system).

Components of the system 100 may be positioned at an above-surface location, such as on an offshore platform 20 or a vessel, and/or a subsea location, such as within an enclosure of a component of the subsea electrical system 10. For example, in some embodiments, the controller 110 may be positioned at a subsea location and communicate with the simulator 120 via a communications link, while in other embodiments, the simulator 120 and controller may be positioned at a subsea location and communicate with the monitor 130 via a communications link.

Figure 2:
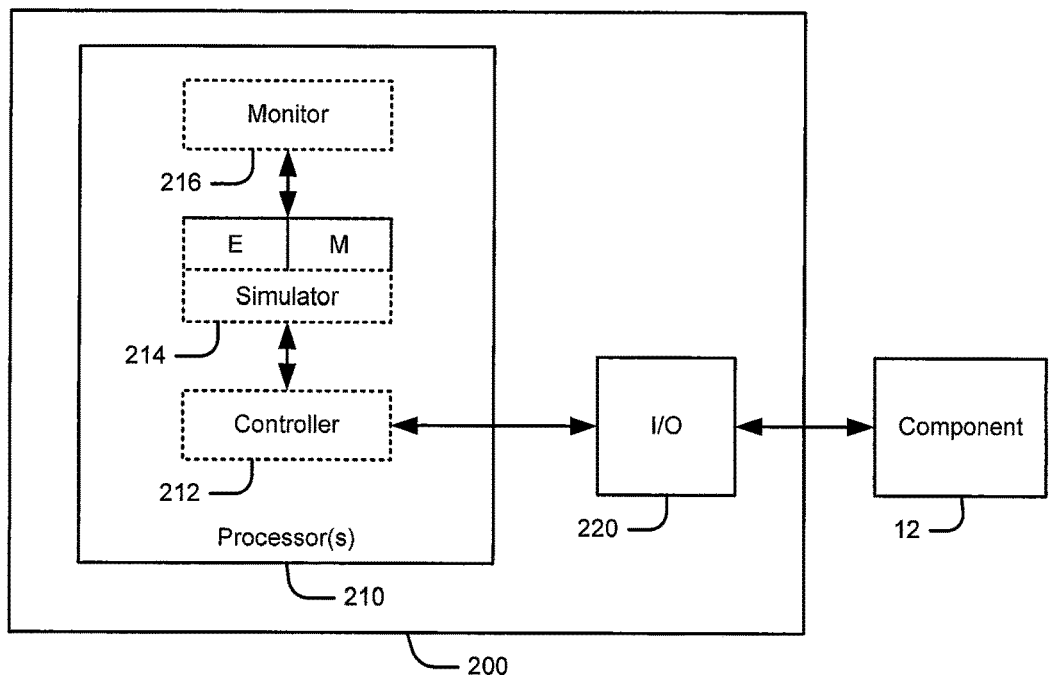
FIG. 2 is a schematic diagram illustrating a hardware-in-the-loop (HIL) apparatus according to further embodiments of the inventive subject matter.

FIG. 2 illustrates an exemplary implementation of an HIL system 200 according to further embodiments. The system 200 may include one or more data processors (e.g., microprocessors, microcontrollers and the like, along with associated memory and peripheral circuitry) coupled to input/output circuitry 220 that interfaces with a system component 12. It will be appreciated that the interface between the I/O circuitry 220 and the system component 12 may use any of a variety of different communications media, including, but not limited to wired links, optical links, and wireless links.

The processor(s) 210 may be configured to provide a controller 212 that is configured to control the system component 12 via the I/O circuitry 220. The controller 212 may be configured, for example, to provide control functions using feedback signals from the controlled component 12 and/or other system components associated therewith. The processor(s) 212 may also be configured to provide a simulator 214 that maintains a model of the system of which the component 12 is a part. The model maintained by the simulator 214 may be configured to incorporate electrical (E) (e.g., lumped circuit, electromagnetic, etc.), mechanical (M) (e.g., structural dynamics, heat transfer, etc.) and other characteristics. The simulator 214 may be configured to detect conditions that may be associated with an underlying change in the controlled system, and may responsively modify the model based on the detected conditions.

The monitor 216 may be configured to detect certain target events associated with particular components of the system responsive to changes in the model maintained by the simulator 214. Such model changes may, for example, correspond to conditions of particular components of the underlying system, such as failure conditions that may require intervention. The monitor 216 may provide indication of such target events to a user, such as a human operator or a supervisory computer system.

Figure 3:
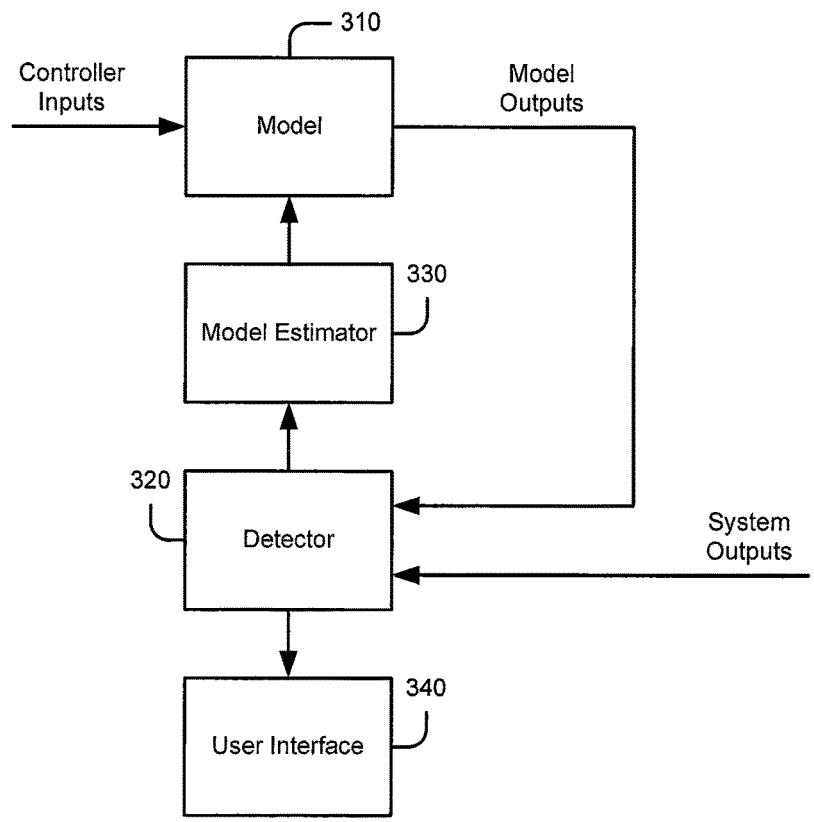
FIG. 3 is a schematic diagram illustrating a model adaptation architecture for the apparatus of FIG. 2 according to some embodiments of the inventive subject matter.

FIG. 3 illustrates a model adaptation architecture that may be utilized in arrangement such as that illustrated in FIG. 2. A model 310 respond to control inputs, producing model outputs that are provided to a detector 320. The detector 320 also receives system outputs from a system corresponding to the model 310 and is configured to detect events that indicate divergence of the model 310 from the system responsive to these inputs. Responsive to detection of such events, the detector 320 may cause a model estimator 330 to modify the model 310. In response to particular target events, the detector 320 may also provide an indication to a user (human and/or machine) via a user interface 340. For example, some events may necessitate model adaptation, but may not rise to the level of a type of event that may necessitate a user intervention. Events not requiring user reporting may include, for example, changes in the controlled system in response to normal aging or certain environmental changes.

Target events necessitating user reporting may include, for example, events associated with system and/or component failures.

The system described above may operate in various modes. For example, the model may be run in a standalone fashion with feedback signals generated by the model itself and using the same control inputs as the real system. This mode maybe used to optimize elements of the model by comparing the feedback signals from the model and the system and modifying the model accordingly. In another mode, the model may be run with feedback signals generated by the real system and command signals that the virtual and real controllers produce may be compared to see if they achieve the same process results with the model using the same control inputs as the real system. This mode maybe used to optimize the control algorithms and constants in the model. The model may also be run standalone with the same real system control inputs and states of the real system may be estimated using the model to obtain information regarding operation of the real system in a virtual fashion. Such information may relate to portions of the real system that are generally inaccessible. Such information may be used, for example, to identify anomalous conditions, diagnose failures or other events, and to enable prediction of future system events, such as failures. For example, the information may be used to predict when the system and/or a component of the system is likely to fail.

Figure 4:
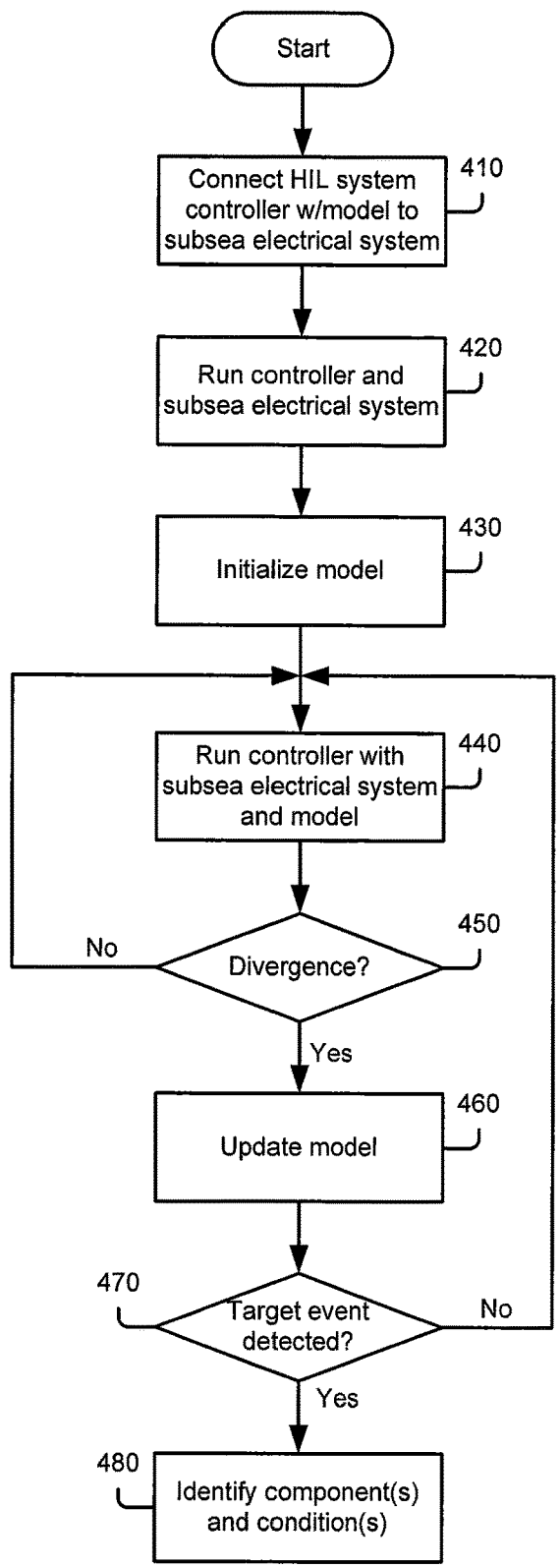
FIG. 4 is a flowchart illustrating operations for operating an HIL control system for a subsea electrical system according to some embodiments of the inventive subject matter.

FIG. 4 is a flowchart illustrating operations that may be performed by the apparatus of FIG. 2. The HIL system controller may be connected to a component of a subsea electrical system, and the controller and system run to initialize the model of the HIL system (blocks, 410, 420, 430). After the model is initialized, the controller may then concurrently control the system and the model (block 440). If a divergence between the model behavior and the system behavior is detected, the model may be updated (blocks 450, 460). If a target event requiring user notification is detected, the system may, for example, identify one or more system components and/or conditions associated with the target event (block 480). As noted above, this information may be used, for example, for failure detection or other diagnostic purposes and/or for failure prediction or other prognostic purposes.

Figure 5:
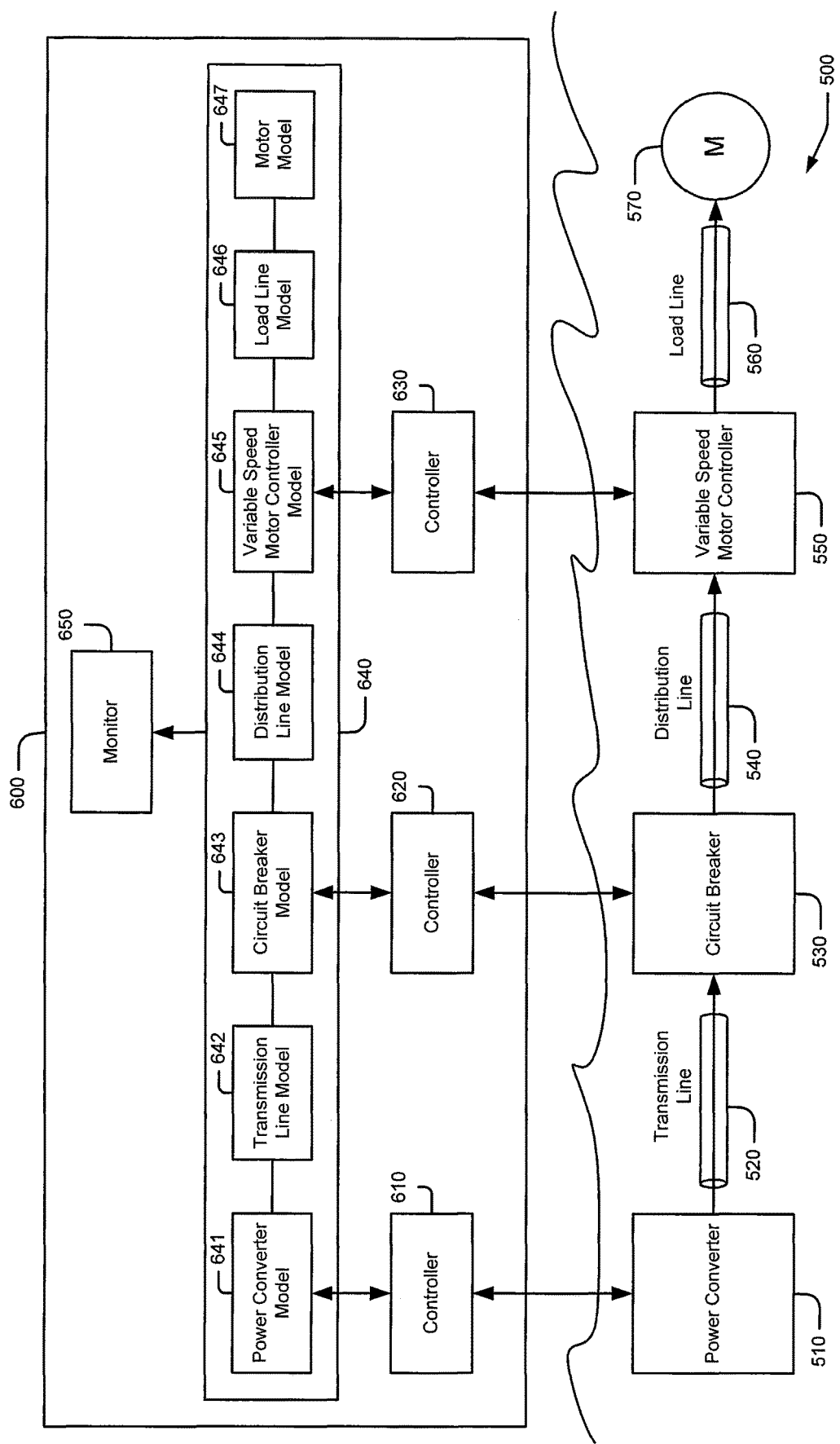
FIG. 5 is a schematic diagram illustrating an HIL control system for a subsea power distribution and motor driver system according to some embodiments of the inventive subject matter.

FIG. 5 illustrates an exemplary implementation of HIL control and monitoring along the lines described above for a subsea electrical system 500 including a motor 570 driven by a variable speed motor drive 550 via a load line 560, the variable speed motor drive 550 being powered via a power converter 510, a transmission line 520, a circuit breaker 530 and a distribution line 540. An HIL control and monitoring system 600 includes respective controllers 610, 620, 630, which are configured control respective ones of the power converter 510, circuit breaker 530 and variable speed motor drive 550. The system 600 further includes a simulator 600 which is configured to maintain models of respective components of the subsea electrical system 500, including a power converter model 641 for the power converter 510, a transmission line model 642 for the transmission line 520, a circuit breaker model 643 for the circuit breaker 530, a distribution line model 644 for the distribution line 540, a variable speed motor drive model 645 for the variable speed motor drive 550, a load line model 646 for the load line 560 and a motor model 647 for the motor 570.

The power line converter model 641, the circuit breaker model 643 and the variable speed motor drive model 645 are configured to receive control signals that are also provided to the corresponding power converter 510, circuit breaker 620 and variable speed motor drive 550. The system 600 is configured to adapt the models 641-647 responsive to system outputs received from the real system 500. A system monitor 650 is coupled to the simulator 640 and is configured to detect target events corresponding to certain changes in the models 641-647, such as model changes indicating a failure or other condition requiring intervention. The monitor 650 may report such target events to a user, such as a human operator and/or a supervisory computer system.

It will be appreciated that the HIL system 600 may be implemented in any of a number of ways. For example, the controllers 610, 620, 630 may be discrete hardware controller units, and the simulator 640 and monitor 650 may be implemented in one or more separate devices coupled to these controller units. In some embodiments, all of the HIL system components may be implemented in a single unit, with the controllers 610, 620, 630, the simulator 640, and the monitor 650 implemented as software modules executing on a common data processor, with the integrated unit further including input/output circuitry for interfacing with the various controlled components. Such a unit may be a general-purpose unit configured to interface with any of a variety of different types of controllable components and flexibly programmable to provide controller, simulator and monitor functions similar to those described above for the particular components being controlled.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
   a controller circuit configured to provide control inputs to first components of a subsea electrical system that controls a subsea electric motor and that further comprises second components electrically interconnected with the first components;
   a simulator circuit coupled to the controller circuit and configured to maintain first models of the first components and second models of the second components and apply the control inputs to the first models concurrent with provision of the control inputs to the first components of the subsea electrical system; and
   a monitor circuit coupled to the simulator circuit and configured to receive feedback signals from the first components of the subsea electrical system, to modify the first models and the second models responsive to the received feedback signals without feedback information from the second components such that the first models and the second models approximate a current state of the first and second components of the subsea electrical system and to detect a failure of one of the second components of the subsea electrical system responsive to a modification of one of the first and second models meeting a predetermined criterion;
   wherein the first components comprise a power converter, a switch, and a motor drive and wherein the second components of the subsea electrical system comprise a power line and a motor.

2. The system of claim 1, wherein the first models and the second models model mechanical and/or electrical characteristics.

3. The system of claim 1, wherein the controller circuit, the simulator circuit and the monitor circuit are implemented in at least one data processor.

4. A method comprising:
generating first models and second models, respectively, of electrically interconnected first components and second components of a subsea electrical system that controls a subsea electric motor;
concurrently providing control inputs to the first models and the first components of the subsea electrical system;
modifying the first models and the second models responsive to feedback signals from the first components of the subsea electrical system without feedback information from the second components such that the first and second models approximate a current state of the system; and
detecting a failure of one of the second components of the subsea electrical system responsive to a modification of one of the first and second models meeting a predetermined criterion;
wherein the first components comprise a power converter, a switch, and a motor drive and wherein the second components of the subsea electrical system comprise a power line and a motor.

5. The method of claim 4, wherein the first models and the second models model mechanical and/or electrical characteristics.

6. A computer program product comprising program code embodied in a non-transitory computer-readable medium and executable on at least one data processor to perform the method of claim 4.

* * * * *

UNITED STATES PATENT AND TRADEMARK OFFICE
CERTIFICATE OF CORRECTION

Page 1 of 1

PATENT NO. : 10,903,778 B2
APPLICATION NO. : 14/574956
DATED : January 26, 2021
INVENTOR(S) : Geraldo Nojima It is certified that error appears in the above-identified patent and that said Letters Patent is hereby corrected as shown below:

On the Title Page

(73) Assignee: Please correct "Eaton Intelligent Power Limited" to read -- Eaton Intelligent Power Limited (IE) --

Signed and Sealed this
First Day of June, 2021

Drew Hirshfeld
*Performing the Functions and Duties of the
Under Secretary of Commerce for Intellectual Property and
Director of the United States Patent and Trademark Office*